US008200576B1

(12) United States Patent  
Zettner et al.

(10) Patent No.: US 8,200,576 B1
(45) Date of Patent: Jun. 12, 2012

(54) COMPREHENSIVE ONLINE LOAN TRANSACTION

(75) Inventors: Steven Dale Zettner, San Antonio, TX (US); Ron DiGiacomo, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1668 days.

(21) Appl. No.: 11/322,498

(22) Filed: Dec. 30, 2005

(51) Int. Cl.
*G06Q 30/00* (2012.01)
(52) U.S. Cl. ......................................................... 705/39
(58) Field of Classification Search ........................ None
See application file for complete search history.

(56) References Cited

U.S. PATENT DOCUMENTS

| | | | | |
|---|---|---|---|---|
| 4,799,156 | A | * | 1/1989 | Shavit et al. ............... 705/26.3 |
| 5,220,501 | A | * | 6/1993 | Lawlor et al. ................. 705/40 |
| 5,778,178 | A | | 7/1998 | Arunachalum |
| 5,850,442 | A | | 12/1998 | Muftic |
| 5,878,405 | A | | 3/1999 | Grant et al. |
| 5,930,764 | A | | 7/1999 | Melchione et al. |
| 6,018,724 | A | * | 1/2000 | Arent .............................. 705/44 |
| 6,021,202 | A | | 2/2000 | Anderson et al. |
| 6,226,623 | B1 | * | 5/2001 | Schein et al. ................. 705/35 |
| 6,317,727 | B1 | * | 11/2001 | May ............................ 705/36 R |
| 6,366,682 | B1 | | 4/2002 | Hoffman et al. |
| 6,594,376 | B2 | | 7/2003 | Hoffman et al. |
| 6,606,606 | B2 | * | 8/2003 | Starr .......................... 705/36 R |
| 6,785,661 | B1 | | 8/2004 | Mandler et al. |
| 6,856,970 | B1 | * | 2/2005 | Campbell et al. ............. 705/35 |
| 6,898,574 | B1 | * | 5/2005 | Regan ............................ 705/38 |
| 7,146,159 | B1 | | 12/2006 | Zhu |
| 7,177,836 | B1 | | 2/2007 | German et al. |
| 7,366,694 | B2 | | 4/2008 | Lazerson |
| 7,499,885 | B2 | | 3/2009 | Danpour |
| 7,543,738 | B1 | | 6/2009 | Saunders et al. |
| 2001/0011236 | A1 | | 8/2001 | Shell |
| 2001/0047307 | A1 | | 11/2001 | Bennett et al. |
| 2002/0069158 | A1 | | 6/2002 | Larkin et al. |
| 2002/0073022 | A1 | | 6/2002 | Wisecarver, III et al. |
| 2002/0091629 | A1 | | 7/2002 | Danpour |
| 2002/0107790 | A1 | | 8/2002 | Nielson |
| 2002/0116302 | A1 | | 8/2002 | Wilmes et al. |
| 2003/0028481 | A1 | | 2/2003 | Flitcroft et al. |
| 2003/0139990 | A1 | | 7/2003 | Greco |

(Continued)

OTHER PUBLICATIONS

"E-Lending" Wikipedia, the free encyclopedia. Dec. 2005. http://en.wikipedia.org/wiki/E-Lending.

(Continued)

*Primary Examiner* — Thomas Dixon
*Assistant Examiner* — Gerald Vizvary
(74) *Attorney, Agent, or Firm* — Schwegman, Lundberg & Woessner, P.A.

(57) ABSTRACT

Method and system are disclosed for conducting a commercial transaction requiring a monetary loan online. The method/system allows a consumer or borrower to access a lending institution over a network connection and apply for a monetary loan online. The loan application is processed in real time and the borrower is notified of the type of loan, loan amount, interest rate, etc., that he/she is qualified for. Upon acceptance of the loan terms, the borrower is provided with a personal identification number (PIN) and a unique lender transaction ID that serves as confirmation of the loan. The lender transaction ID may then be taken to a suitable seller and used to conduct the transaction. The seller simply accesses the lending institution over a network connection, enters the lender transaction ID, the borrower's PIN, and other transaction-related information, and the lending institution automatically sends the appropriate payment to the seller.

21 Claims, 17 Drawing Sheets

U.S. PATENT DOCUMENTS

| | | |
|---|---|---|
| 2004/0128229 A1 | 7/2004 | Raines et al. |
| 2004/0236674 A1 | 11/2004 | Chen et al. |
| 2004/0254848 A1* | 12/2004 | Golan et al. ............... 705/26 |
| 2005/0234814 A1 | 10/2005 | Jones et al. |
| 2006/0076400 A1 | 4/2006 | Fletcher |
| 2008/0059367 A1 | 3/2008 | Anuszewski et al. |

OTHER PUBLICATIONS

"Credit Card Online." Your Dictionary.com viewed on Jun. 14, 2006 http://www.yourdictionary.com/business_profile/debt/creditcard/.

"Resource Center: Frequently Asked Questions." eOriginal, the electronic original company, viewed on Jun. 14, 2006 http://www.eoriginal.com/library/faq.html.

U.S. Appl. No. 11/322,775 Non-Final Office Action mailed Jul. 2, 2010, 11 pgs.

U.S. Appl. No. 11/322,775, Final Office Action mailed Apr. 14, 2009, 9 pgs.

U.S. Appl. No. 11/322,775, Final Office Action mailed Jan. 7, 2010, 10 pgs.

U.S. Appl. No. 11/322,775, Final Office Action mailed Oct. 5, 2009, 10 pgs.

U.S. Appl. No. 11/322,775, Non Final Office Action mailed Jul. 11, 2011, 14 pgs.

U.S. Appl. No. 11/322,775, Non Final Office Action mailed Sep. 30, 2008, 8 pgs.

U.S. Appl. No. 11/322,775, Preliminary Amendment filed Jul. 14, 2006, 3 pgs.

U.S. Appl. No. 11/322,775, Response filed Jan. 5, 2010 to Final Office Action mailed Oct. 5, 2009, 11 pgs.

U.S. Appl. No. 11/322,775, Response filed May 9, 2011 to Final Office Action mailed Jan. 7, 2011, 7 pgs.

U.S. Appl. No. 11/322,775, Response filed Jul. 14, 2009 to Final Office Action mailed Apr. 14, 2009, 10 pgs.

U.S. Appl. No. 11/322,775, Response filed Aug. 22, 2008 to Restriction Requirement mailed Jun. 27, 2008, 6 pgs.

U.S. Appl. No. 11/322,775, Response filed Dec. 2, 2010 to Non Final Office Action mailed Jul. 2, 2010, 7 pgs.

U.S. Appl. No. 11/322,775, Response filed Dec. 29, 2008 to Non Final Office Action mailed Sep. 30, 2008, 18 pgs.

U.S. Appl. No. 11/322,775, Restriction Requirement mailed Jun. 27, 2008, 6 pgs.

U.S. Appl. No. 11/323,202, Ex Parte Quayle Action mailed Dec. 10, 2010, 6 pgs.

U.S. Appl. No. 11/323,202, Final Office Action mailed Nov. 27, 2009, 10 pgs.

U.S. Appl. No. 11/323,202, Non Final Office Action mailed Apr. 1, 2009, 11 pgs.

U.S. Appl. No. 11/323,202, Non-Final Office Action mailed Jun. 24, 2010, 13 pgs.

U.S. Appl. No. 11/323,202, Notice of Allowance mailed Apr. 1, 2011, 9 pgs.

U.S. Appl. No. 11/323,202, Notice of Allowance mailed Oct. 11, 2011, 10 pgs.

U.S. Appl. No. 11/323,202, Preliminary Amendment filed Jul. 14, 2006, 3 pgs.

U.S. Appl. No. 11/323,202, Response filed Feb. 10, 2011 to Ex Parte Quayle Action mailed Dec. 10, 2010, 4 pgs.

U.S. Appl. No. 11/323,202, Response filed Mar. 1, 2010 to Final Office Action mailed Nov. 27, 2009, 10 pgs.

U.S. Appl. No. 11/323,202, Response filed Jul. 1, 2009 to Non Final Office Action mailed Apr. 1, 2009, 13 pgs.

U.S. Appl. No. 11/323,202, Response filed Sep. 24, 2010 to Non Final Office Action mailed Jun. 24, 2010, 10 pgs.

US 7,996,303, 08/2011, Zettner et al. (withdrawn)

* cited by examiner

| Home | My Accounts | Documents | Messages | Log Off | enter keycode or search term

My Lender | Insurance | Banking | Investments | Financial Guidance | Shopping & Discounts | About Lender

Checking | Savings | Credit Cards | Loans | CDs | IRAs | Asset Management Account

Loan Application
Member Information

Federal law requires us to obtain, verify and record your name, address and other informatiom that will allow us to identify you when you open an account. Trust Lender to be responsible in sharing informatiion as described in the Lender Privacy Promise.

Application Information 602

| What is the purpose of this loan? | Purchase a Car |
| How old is this car? | ○ Current or previous model year  ○ 2-6 years  ○ 7 years or older |
| How much would you like to borrow? | $ |

Borrower Information 604

| Will this be an Individual or a Joint application? | ⊙ Individual  ○ Joint |
| Name: | JOHN SMITH |
| Primary Mailing Address: | 123 USA BLVD |
| | SAN ANTONIO, TX 78228 |
| Is this also your physical address? | ⊙ Yes  ○ No |
| Home Phone: | (210) 123-4567 |
| Work Phone: | (210) 123-4567 Ext: 123 |

| | |
|---|---|
| | Home \| My Accounts \| Documents \| Messages \| Log Off |
| | enter keycode or search term [GO] |

My Lender \| Insurance \| Banking \| Investments \| Financial Guidance \| Shopping & Discounts \| About Lender
Checking \| Savings \| Credit Cards \| Loans \| CDs \| IRAs \| Asset Management Account

Loan Application
Verification
Please verify the following information. To make a change, select the appropriate link.

702

| | |
|---|---|
| Loan Amount: | $25,000.00 |
| Loan Purpose: | Purchase a Car |
| Is the car new or used? | New |
| Name: | JOHN SMITH |
| Primary Mailing Address: | 123 USA BLVD |
| | SAN ANTONIO, TX 78230 |
| Is this also your physical address? | Yes |
| Home Phone: | (210) 123-4567 |
| Work Phone: | (210) 123-4567 Ext: 123 |
| U.S. Citizen: | Yes |
| Employment Status: | Employed |
| Employer Name: | International Paper |
| Length of Employment: | More than 2 years |
| Income: | $75,000.00 |
| Primary Residence: | Rent |

Home | My Accounts | Documents | Messages | Log Off enter keycode or search term My Lender | Insurance | Banking | Investments | Financial Guidance | Shopping & Discounts | About Lender Checking | Savings | Credit Cards | Loans | CDs | IRAs | Asset Management Account Loan Application
Loan Offers Congratulations! Your application for a loan of $ has been approved. Additionally, based on the information you have provided, we can offer you a loan of up to $37,000.00.

Here are some examples of the payment options available to you.

902

| Amount: | $ | $ | $ |
|---|---|---|---|
| Finance Rate: | 5.49% fixed | 5.49% fixed | 5.49% fixed |
| Term: | 48 months | 60 months | 72 months |
| Payment: | $581.29 | $477.41 | $408.33 |
| Finance Charge: | $790.32 | $852.70 | $926.37 |
| Total Loan Cost: | $25,790.32 | $25,852.70 | $25,926.37 |
| | Accept | Accept | Accept |

You may accept an option that interests you, or wait to select a loan once you are ready to make your purchase and close your loan.

Decide Later

Confirmation

The following highlighted number must be presented to the dealer after your purchase price is negotiated. This is number, in addition to your PIN, will complete the transaction. For your convenience, please print a copy of this page.

To Whom It May Concern:

1202 Please visit usaa.com and click on the "auto dealer" tab to receive funding for this member's loan. You will need to provide the following information:

- Transaction ID: 12a45f78e
- Your dealership NADA membership ID number.
- Vehicle Identification Number.
- Exact Amount Financed (including all additional costs and tax).

You will receive confirmation of funding and appropriate insurance coverage for the specified vehicle.

OK

For additional information on the auto buying process, please click here.

Home | About Lender | Products & Services | Eligibility | News Center | Employment | Auto Dealers Dealer education/ presentations.

Welcome to Lender Dealer Network

Please enter the Lender transaction ID from your customer and your NADA ID. If you are not a member of NADA, please call 800-888-8888.

Transaction ID  NADA ID
12a45f78e          123456

Transaction Details

This loan is for Steve Harrison who is approved for a loan amount up to $45,000.

Good morning...
Tom Benson Chevrolet
2555 Main St
San Antonio, TX 78222

VIN | Exact Amount Financed | MSRP
456 | $ 35,143.28 | $ 40,000

1312 Funding preference:  1306  1308  1310
- Personal Check (immediate funds) Routing #  Account Number
- Direct Deposit (2 business days)

By clicking "OK" you agree to place USAA as the lien holder on this vehicle....

Home | About Lender | Products & Services | Eligibility | News Center | Employment | Auto Dealers Welcome to Lender Dealer Network                                    Dealer education/ presentations.

Please enter the Lender transaction ID from your customer and your NADA
ID. If you are not a member of NADA, please call 800-888-8888.

Transaction ID    NADA ID
12a45f78e             123456

---

Transaction Details                                   Good morning.
                                                          Tom Benson Chevrolet
This loan is for Steve Harrison who is approved for a loan amount up to $45,000.   2555 Main St
                                                          San Antonio, TX 78222
VIN              Exact Amount Financed    MSRP
            $        35,143.28                $   40,000

Funding preference:

○ Personal Check (immediate funds) Routing #    Account Number
   ○ Direct Deposit (2 business days)

---

Member Authorization                    By clicking "OK" you agree
05Mustang                                   ....
         ↖                                  OK
          1320

FIG. 15

COMPREHENSIVE ONLINE LOAN TRANSACTION

CROSS-REFERENCE TO RELATED APPLICATIONS

This application is related in subject matter to, and hereby incorporates by reference, the following co-pending U.S. patent applications: application Ser. No. 11/322,775, entitled COMPREHENSIVE ONLINE LOAN TRANSACTION, filed Dec. 30, 2005 (Applicant Reference No. US-0064.02); and application Ser. No. 11/323,202, entitled COMPREHENSIVE ONLINE LOAN TRANSACTION, filed Dec. 30, 2005 (Applicant Reference No. US-0064.03).

TECHNICAL FIELD

The disclosed embodiments relate generally to commercial transactions that require financing or a monetary loan and, more particularly, to a system and method for conducting such commercial transactions online.

BACKGROUND

For the average consumer, most major commercial transactions, such as buying a house, an automobile, a business, and the like, require financing or a monetary loan of some kind in order to pay for the transaction. There are many kinds of monetary loans available depending on the type of transaction contemplated, including personal loans, home mortgages, business lines of credit, and so forth. Similarly, there are many variables or negotiable terms associated with each monetary loan, such as interest rates, loan periods, payment options, and the like. Other important factors to consider include the type of lending institution (e.g., bank, credit union, etc.), the potential seller (e.g., national chain, local dealer, etc.), and an insurer if needed.

An example of a procedure 100 for conducting a transaction involving a monetary loan is illustrated in FIG. 1. The specific example of FIG. 1 is an automobile purchase, but the procedure 100 may be applied to other types of commercial transactions as well. A consumer or borrower 102 begins the procedure 100 by calling his/her lending institution (e.g., bank, credit union, etc.) 104 to apply for a monetary loan. After checking the borrower's personal information and credit history, a representative of the lending institution 104 informs the borrower 102 of the loan amount, period, and interest rate that he/she is eligible for. If the borrower 102 agrees to the terms of the loan, the lender representative delivers (e.g., by express mail, courier service, etc.) a "sight draft" 106 to the borrower 102. The "sight draft" 106, when executed, grants to the lending institution 104 a security interest in the purchased automobile as collateral for the monetary loan.

With the "sight draft" 106 in hand, the borrower 102 may proceed to an appropriate automobile dealership 108 and purchase his/her automobile of choice. For the automobile dealership 108, the "sight draft" 106 essentially serves as a check or cash payment from the lending institution 104. The dealership 108 simply fills in the pertinent information on the "sight draft" 106, including the dealership's name, the automobile's vehicle identification number (VIN), and the purchase price, and the borrower 102 signs the "sight draft" 106 to complete the transaction. Sometimes, the automobile dealership 108 may require the borrower 102 to provide proof of automobile insurance coverage to complete the transaction. In that case, the borrower 102 may need to contact his/her insurer 110 in order to obtain the proof of insurance coverage.

As can be seen from the foregoing, existing procedures for conducting a transaction involving financing or a monetary loan have a number drawbacks and limitations. For one thing, the lending institution 104 must employ a staff of representatives to receive telephone calls and/or personal visits from the borrower 102 and other consumers. These lender representatives are typically available only during normal business hours (e.g., 9 AM-5 PM), which may not be suitable or convenient for the borrower 102. In addition, because the "sight draft" 106 must be physically delivered to the borrower 102, there is usually a time delay of up to a day or more from the moment the borrower 102 is approved for the monetary loan. Furthermore, some states and/or automobile dealerships do not accept or recognize the legality or validity of the "sight draft" 106. All of this results in a procedure that is often complicated, time-consuming, and inconvenient for the average consumer.

Accordingly, what is needed is a way to conduct a commercial transaction requiring a monetary loan that overcomes the drawbacks and limitations of the existing procedures. In particular, what is needed is a way to conduct such a transaction where one or more aspects of the transaction, including obtaining of the monetary loan, may be performed online.

SUMMARY

The disclosed embodiments are directed to a method and system for conducting a commercial transaction requiring a monetary loan online. The method/system allows a consumer or borrower to access a lending institution over a network connection and apply for a monetary loan. The loan application is processed in real time and the borrower is notified of the type of loan, loan amount, interest rate, etc., that he/she is qualified for. Upon acceptance of the loan terms, the borrower is provided with a personal identification number (PIN) and unique lender transaction identification (ID) that serves as confirmation of the loan. The lender transaction ID may then be taken to a suitable seller and used to conduct the transaction. The seller simply accesses the lending institution over a network connection, enters the lender transaction ID, the borrower's PIN, and other transaction-related information, and the lending institution automatically sends the appropriate payment to the seller.

BRIEF DESCRIPTION OF THE DRAWINGS

The foregoing and other advantages will become apparent from the following detailed description and upon reference to the drawings, wherein:

FIGS. 4-15 illustrate exemplary web pages for conducting a commercial transaction requiring a monetary loan;

DETAILED DESCRIPTION

Following is a detailed description with reference to the drawings wherein the same reference labels are used for the same or similar elements. As used throughout this description and the claims, the terms "a" and "an" are intended to mean "one or more."

As explained above, existing procedures for conducting a commercial transaction requiring financing or a monetary loan are often confusing, time-consuming, and inconvenient for the average consumer. Various embodiments provide a consumer or borrower the option to conduct such a transaction online, thus avoiding the need for physical documentation, such as "sight drafts" and other loan-related documents, and the complications and delays associated therewith. The consumer or borrower may simply apply for and obtain the financing or loan online at any time by accessing a suitable lending institution over a network connection. Such an arrangement allows loan or financing applications to be processed in real time and funds to be made available quickly without having to rely on lender representatives. Similarly, sellers or dealers may complete the transaction by accessing the lending institution over a network connection to automatically obtain payment for the purchased items. This allows sellers to be paid in real time while avoiding potential legality or validity issues concerning the "sight draft" 106 and other such documents.

Figure 1:
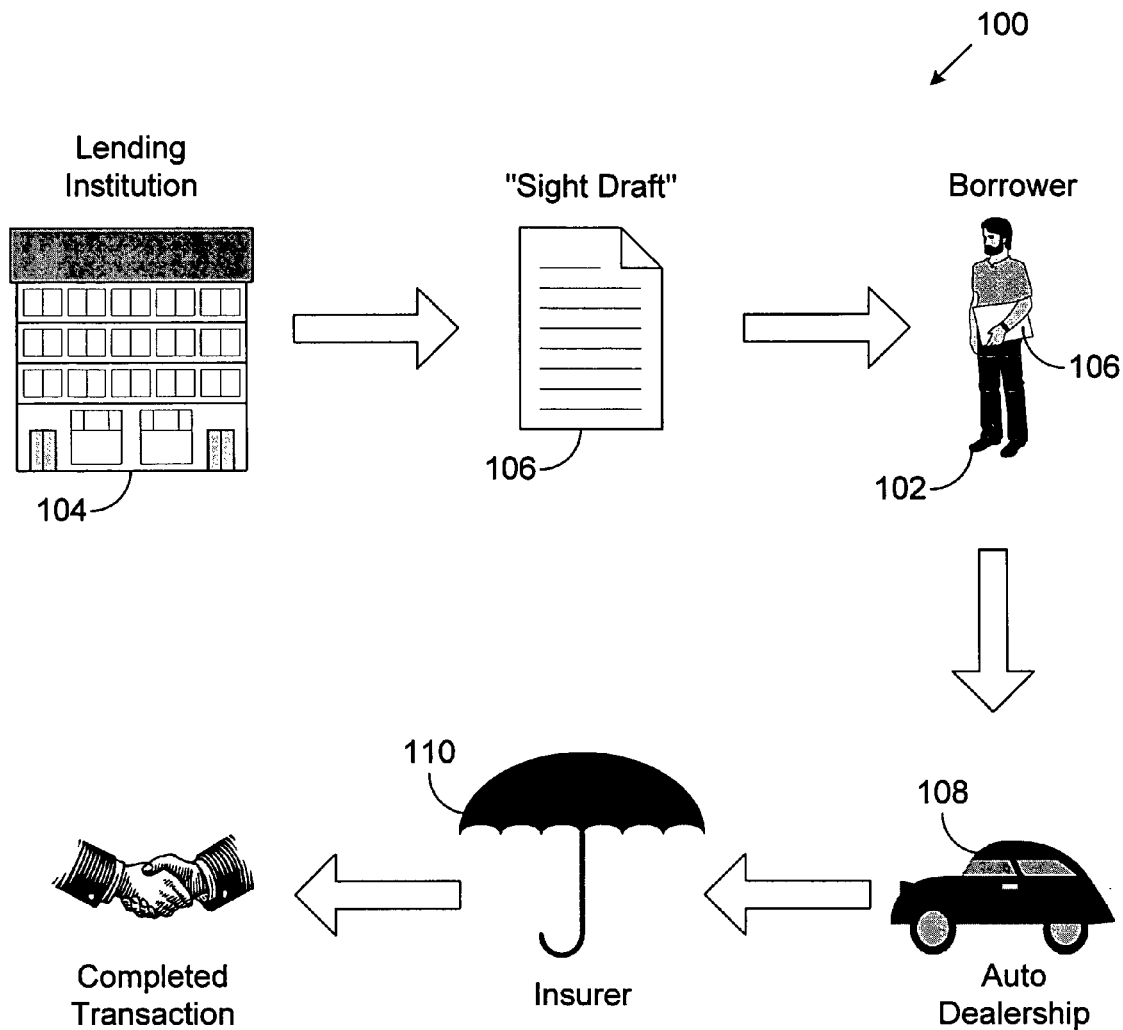
FIG. 1, described previously, illustrates a procedure for conducting a commercial transaction requiring a monetary loan according to the prior art.
Figure 2:
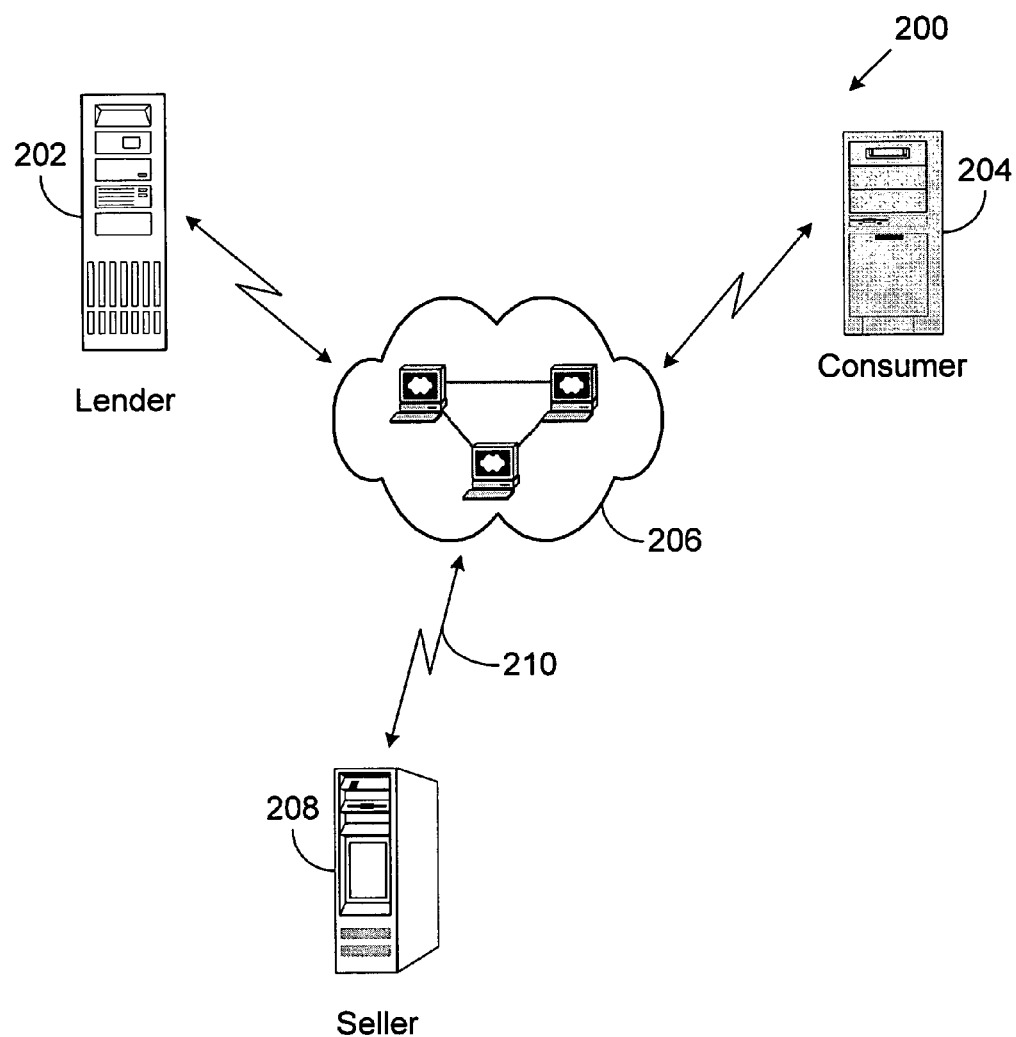
FIG. 2 illustrates an exemplary system for conducting a commercial transaction requiring a monetary loan.

FIG. 2 illustrates a system 200 that may be used to conduct a transaction of the type mentioned above. The system 200 includes a lender computing system 202 connected to a consumer computing system 204 over a network 206. The network 206, which may be a private network or a public network (e.g., the Internet), also connects a seller computing system 208 to the lender computing system 202 (and to the consumer computing system 204). The computing systems 202, 204, and 208 may be any type of computer or computing device suitable for that system's particular requirements, including a mainframe computer, workstation computer, server, desktop computer, laptop computer, cell phone, personal digital assistant (PDA), and the like.

The connection between the network 206 and the various computing systems 202, 204, and 208 may be any suitable network connection, including a wired connection, wireless connection, and/or a combination of both. For simplicity, the connections are shown in FIG. 2 as a double-headed arrow between each computing system 202, 204, and 208 and the network 206. Note also that although only a single lender computing system 202, consumer computing system 204, and seller computing system 208 are shown, those having ordinary skill in the art will understand that multiple instances of each type of computing systems may be connected to one another over the network 206.

When a consumer wishes to conduct a transaction involving financing or a monetary loan, he/she may use the consumer computing system 204 to access the lender computing system 202 and apply for the loan from the lending institution. The lender computing system 202 usually asks the consumer to provide various personal and financial information (e.g., name, date of birth, annual salary, etc.) via the consumer computing system 204. The lender computing system 202 thereafter may send this information over the network 206 to one or more credit reporting bureaus (e.g., Equifax, Experian, TransUnion, etc.) to obtain a report of the consumer's credit history. The credit history report is preferably obtained in real time in order to expedite processing of the loan application, but it is certainly possible to delay the report.

A determination is then made by the lender computing system 202 as to whether the consumer qualifies for financing or a loan based, for example, on his/her credit history and the lending institution's internal lending policies. Assuming the consumer is eligible, the lender computing system 202 notifies the consumer via the consumer computing system 204 of the loan type and amount, the interest rate, the duration of the loan, and other pertinent loan terms. Once the consumer agrees to the terms, the lender computing system 202 generates a unique lender transaction ID that may be used to confirm to a seller that a loan has been made to the particular consumer in question. The lender computing system 202 also asks the consumer at this point to select a personal identification number (PIN) that may be used by the lender computing system 202 to verify the identity of the consumer. The consumer may now proceed to a suitable seller to make his/her purchase.

With the lender transaction ID in hand, the seller is essentially guaranteed that the lending institution will finance the consumer's purchase. In this respect, the lender transaction ID functions in much the same way as the "sight draft" mentioned above, but without the complications and delays associated with the "sight draft." The seller simply accesses the lender computing system 202 via the seller computing system 208 to reference the loan using the lender transaction ID. If the lender transaction ID is valid, the lender computing system 202 asks the seller to provide additional information related to the transaction (e.g., purchase price, vehicle identification number (VIN), year, make, model, etc.). Finally, the lender computing system 202 asks the consumer to enter his/her PIN to verify the identity of the consumer. In some embodiments, the lender computing system 202 may also require the seller to be verified, for example, by checking to see whether the seller is registered with an appropriate industry association or is part of a seller network. In any event, if the PIN is valid, the lender computing system 202 instructs the lending institution to forward an amount of money equal to the indicated purchase price into an account specified by the seller.

Sometimes the seller may not have a connection to the network 206 and therefore cannot access the lender computing system 202. In that case, the seller may telephone the lending institution (e.g., via a toll-free number) and provide the lender transaction ID. Upon verifying the lender transaction ID, a lender representative may call the consumer at a telephone number previously designated by the consumer, for example, a cell phone number. The consumer may then verify his/her identification to the lender representative to complete the transaction.

Figure 3:
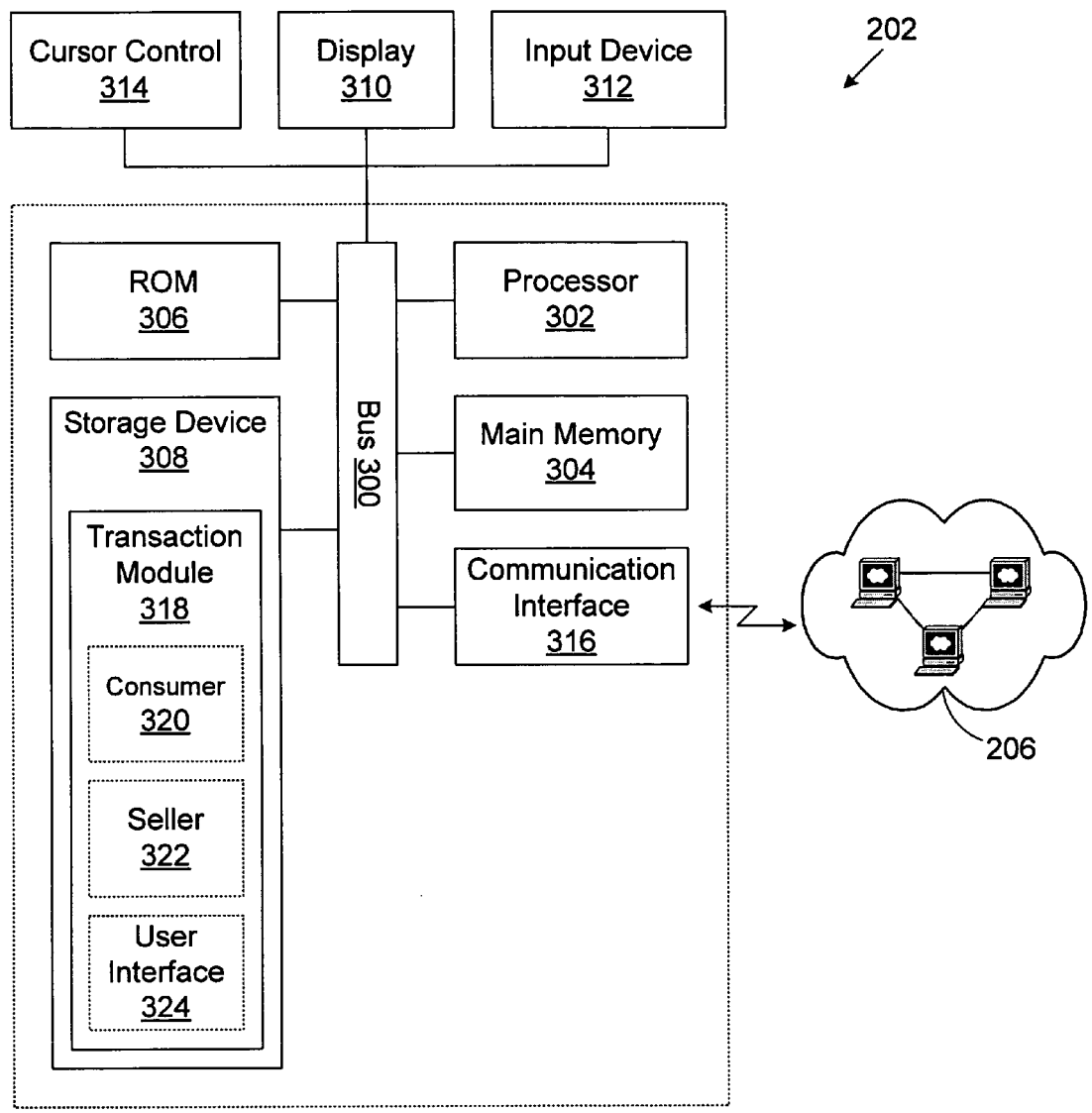
FIG. 3 illustrates an exemplary computing system for conducting a commercial transaction requiring a monetary loan.

FIG. 3 illustrates the lender computing system 202 in more detail. In one embodiment, the lender computing system 202 is a web server hosting a publicly available website for the lending institution and the consumer accesses the website via a commercially available web browser running on the consumer computing system 204. In other embodiments, the lender computing system 202 may be a conventional application server hosting a proprietary online service accessible only via a private network. In any event, the lender computing system 202 typically has appropriate security mechanisms in place to prevent unauthorized third parties from intercepting the consumer's information.

In the implementation shown, the lender computing system 202 may include a bus 300 or other communication mechanism for communicating information and a processor 302 coupled with the bus 300 for processing information. The lender computing system 202 also includes a main memory 304, such as a random access memory (RAM) or other dynamic storage device, coupled to the bus 300 for storing computer-readable instructions to be executed by the processor 302. The main memory 304 also may be used for storing temporary variables or other intermediate information during execution of the instructions to be executed by the processor

302. The lender computing system 202 further includes a read-only memory (ROM) 306 or other static storage device coupled to the bus 300 for storing static information and instructions for the processor 302. A computer-readable storage device 308, such as a magnetic disk or optical disk, is coupled to the bus 300 for storing information and instructions for the processor 302.

The lender computing system 202 may be coupled via the bus 300 to a display 310, such as a cathode ray tube (CRT), for displaying information to a user. An input device 312, including, for example, alphanumeric and other keys, is coupled to the bus 300 for communicating information and command selections to the processor 302. Another type of user input device is a cursor control 314, such as a mouse, a trackball, or cursor-direction keys for communicating direction information and command selections to the processor 302 and for controlling cursor movement on the display 310. The cursor control 314 typically has two degrees of freedom in two axes, a first axis (e.g., x) and a second axis (e.g., y), that allow the device to specify positions in a plane.

The term "computer-readable instructions" as used above refers to any instructions that may be performed by the processor 302 and/or other component. Similarly, the term "computer-readable medium" refers to any storage medium that may be used to store the computer-readable instructions. Such a medium may take many forms, including, but not limited to, non-volatile media, volatile media, and transmission media. Non-volatile media include, for example, optical or magnetic disks, such as the storage device 308. Volatile media include dynamic memory, such as main memory 304. Transmission media include coaxial cables, copper wire and fiber optics, including wires of the bus 300. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

Various forms of the computer-readable media may be involved in carrying one or more sequences of one or more instructions to the processor 302 for execution. For example, the instructions may initially be borne on a magnetic disk of a remote computer. The remote computer can load the instructions into its dynamic memory and send the instructions over a telephone line using a modem. A modem local to the lender computing system 202 can receive the data on the telephone line and use an infrared transmitter to convert the data to an infrared signal. An infrared detector coupled to the bus 300 can receive the data carried in the infrared signal and place the data on the bus 300. The bus 300 carries the data to the main memory 304, from which the processor 302 retrieves and executes the instructions. The instructions received by the main memory 304 may optionally be stored on the storage device 308 either before or after execution by the processor 302.

The lender computing system 202 may also include a communication interface 316 coupled to the bus 300. The communication interface 316 provides a two-way data communication coupling between the lender computing system 202 and the network 206. For example, the communication interface 316 may be an integrated services digital network (ISDN) card or a modem used to provide a data communication connection to a corresponding type of telephone line. As another example, the communication interface 316 may be a local area network (LAN) card used to provide a data communication connection to a compatible LAN. Wireless links may also be implemented. In any such implementation, the communication interface 316 sends and receives electrical, electromagnetic, optical, or other signals that carry digital data streams representing various types of information.

In some embodiments, a transaction module 318 is installed on the lender computing system 202, for example, on the storage device 308. The transaction module 318 is designed to allow transactions of the type mentioned above to be conducted online, thus eliminating the need for physical documentations, such as "sight drafts" and other loan-related documents. In one embodiment, the transaction module 318 is composed of several components that are described here in terms of their functions, including a consumer component 320, a seller component 322, and a user interface 324. Indeed, the transaction module 318 itself may be only one of several service components (not expressly shown) running on the lender computing system 202, each component allowing one of the services (e.g., insurance, loans, investment, etc.) provided by the lending institution to be available online.

Briefly, the consumer component 320 functions to receive and process loan or financing applications from consumers, determine whether the consumers are eligible for a loan, notify the consumers of the loan terms, generate the unique lender transaction IDs, and obtain the consumer PINs. The seller component 322 is responsible for verifying the lender transaction IDs received from sellers, verifying the identity of the consumers, and forwarding the appropriate payments to the sellers. In some cases, the seller component 322 also ensures that the sellers are legitimate businesses before allowing them to use the transaction IDs. As for the user interface 324, this component generates the various graphical user interfaces used by the consumer component 320 and the seller component 322 to interact with the consumers and the sellers, respectively.

An exemplary implementation of the transaction module 318 as a web-based application (i.e., a website) is illustrated in FIGS. 4-15 via a plurality of web pages. Although not necessary, it is assumed throughout FIGS. 4-15 that the consumer is a member of, or has an account with, the lending institution operating the transaction module 318. Also, the web pages represent merely one possible web page design or layout generated by the graphical user interface component 324. Those having ordinary skill in the art will understand that numerous other designs or layouts may be used. Moreover, these web pages are illustrative only and are not intended to be exhaustive in content or number, nor do they represent a minimum required number of web pages or a particularly preferable sequence of web pages.

Figure 4:
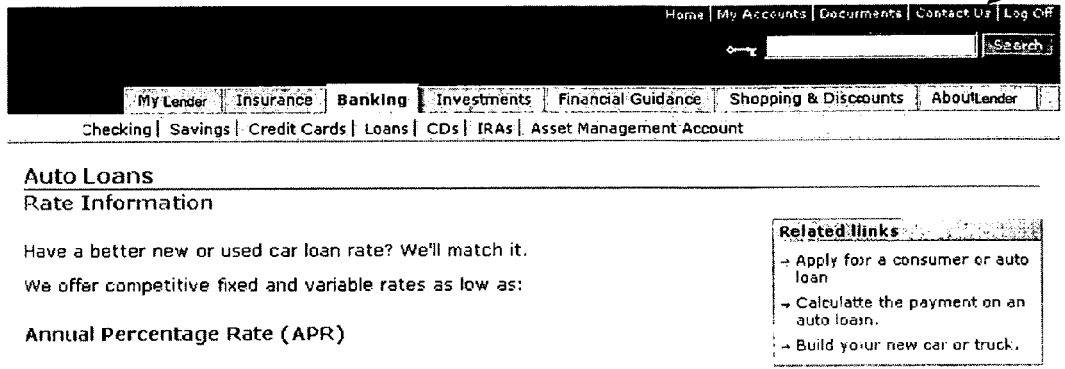

Referring to FIG. 4, an interest rate information web page 400 is shown that may be used by the consumer component 320 in one embodiment to inform a consumer of the various types of loans that are available. This web page 400 is typically displayed once the consumer has logged in to his/her account on the lender computing system 202 and has expressed an interest in obtaining a loan by selecting the "Banking" tab. The interest rate information web page 400 may include, among other things, an annual percentage rate (APR) table 402 that lists the types of loans (e.g., fixed, variable, etc.), the loan periods (e.g., 48 months, 60 months, 72 months, etc.), and the interest rates that are available with each loan type and period.

Figure 5:
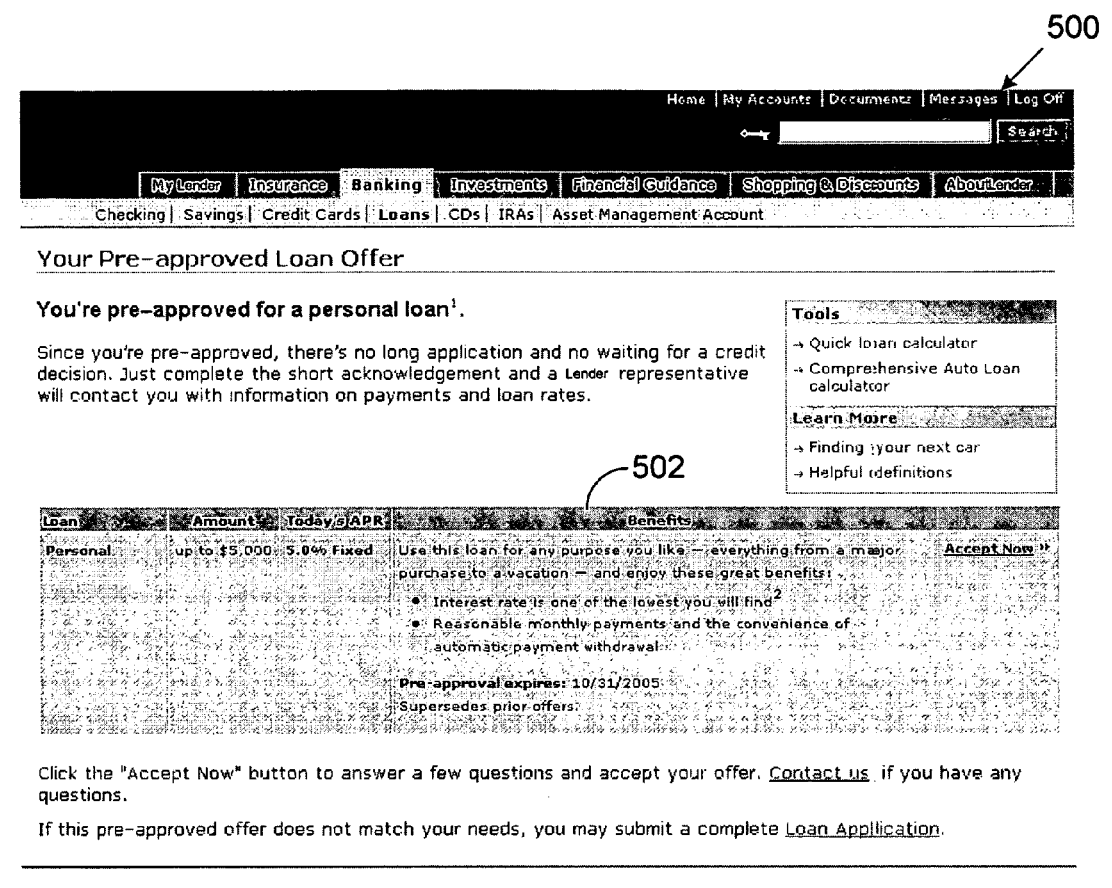

In some cases, the consumer may have previously received an offer from the lending institution for a pre-approved loan. FIG. 5 illustrates a pre-approved loan web page 500 that may be used by the consumer component 320 to notify the consumer of the pre-approved loan. This web page 500 may include, among other things, a table 502 that lists the type of loan (e.g., personal, automotive, etc.), the loan amount, and the interest rate that the consumer has been pre-approved for, along with various other pertinent information. The consumer may then accept the pre-approved loan or apply for a different loan by selecting the appropriate hyperlink on the web page.

FIG. 6 illustrates a loan application web page 600 that may be used by the consumer component 322 when the consumer wishes to apply for a loan. This web page 600 may be one of several web pages (not expressly shown here) that together form a comprehensive loan application that may be used by the lending institution to obtain the information needed to process a loan. The loan application web page 600 may include, among other things, an application information table 602 for specifying the type of loan, the amount of the loan, and other pertinent information. In the present example, the consumer has selected an automotive loan and, therefore, the remaining web pages have been adapted for an automobile purchase. Also included is a borrower information table 604 for obtaining various personal and financial information about the consumer.

After the consumer has completed the comprehensive loan application, he/she may be asked by the consumer component 320 to verify the loan application information provided. FIG. 7 illustrates an exemplary verification web page 700 that may be used by the consumer component 320 to verify the loan application information. The verification web page 700 may include, among other things, and information summary table 702 that lists the various items of information provided by the consumer on the comprehensive loan application (see FIG. 6). The consumer may then verify the information or change the information as needed by selecting the appropriate hyperlink on the web page.

The consumer component 320 thereafter sends the information provided on the comprehensive loan application to one or more credit reporting bureaus and obtains a credit history report for the consumer. Based on the credit history report and the lending institution's internal lending policies, the consumer component 320 determines whether the consumer qualifies for the requested loan.

Figure 8:
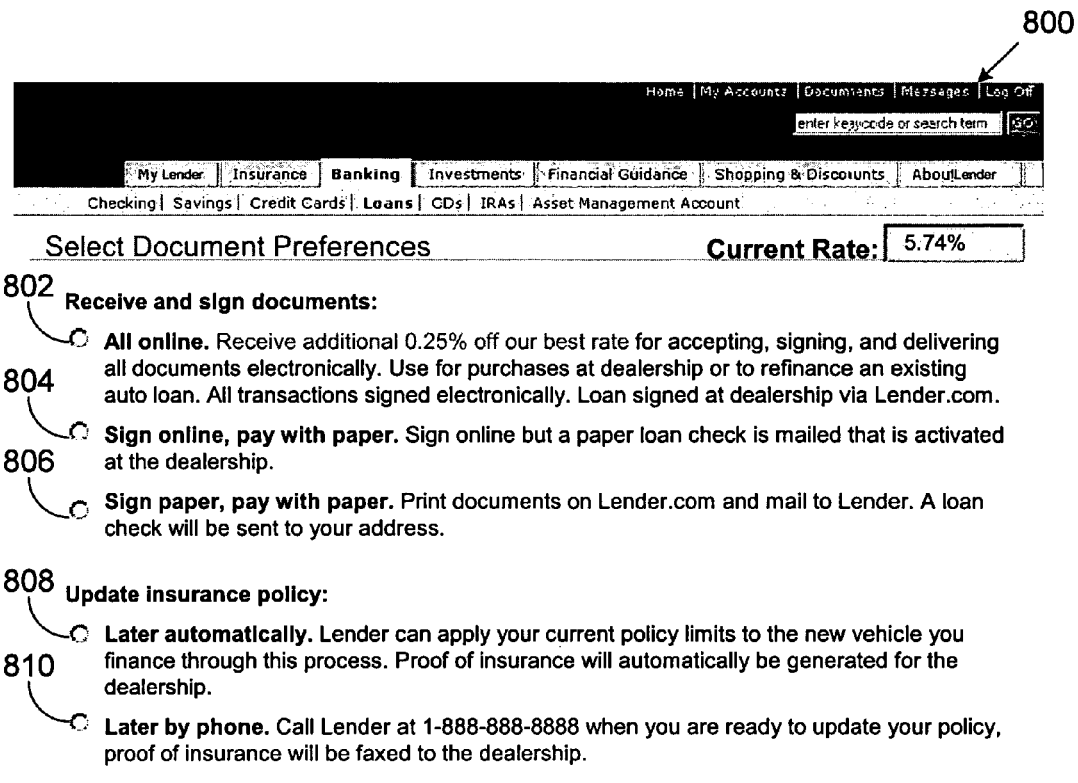

Assuming the consumer is eligible for the requested loan, he/she is given the option of choosing the type of loan documents to be used. FIG. 8 illustrates a document preference web page 800 that may be used by the consumer component 320 for allowing the consumer to select the types of loan documents. As can be seen from this web page 800, the consumer may choose to have all documents accepted, signed, and delivered electronically (option 802), all documents accepted, signed, and delivered by paper (option 804), or combination of both (option 806). In some embodiments, a reduction in interest rate may be provided to the consumer as an incentive to select the electronic option.

In some embodiments, the consumer may have an existing automobile insurance policy with the lending institution. In that case, the document preference web page 800 may further include options for the consumer to update the automobile insurance policy. The update options may include, for example, an option to update the policy automatically (option 808), in which case proof of insurance will be generated electronically for the dealership. The update options may further include an option to update the policy by telephone (option 810), in which case the proof of insurance will be faxed to the dealership later.

Once the document preferences have been selected and, if applicable, the automobile insurance policy update options chosen, the consumer component 320 notifies the consumer of the loan. This may be achieved via a congratulatory message, such as "Congratulations!" and the like, on a congratulatory web page 900, as illustrated in FIG. 9. In conjunction with the congratulatory message, the consumer component 320 may also use the congratulatory web page 900 to inform the consumer of any additional or maximum amount he/is may be eligible to borrow. To this end, the web page 900 may include, among other things, a table 902 listing the various possible loan terms for the additional or maximum amount.

Figure 10:
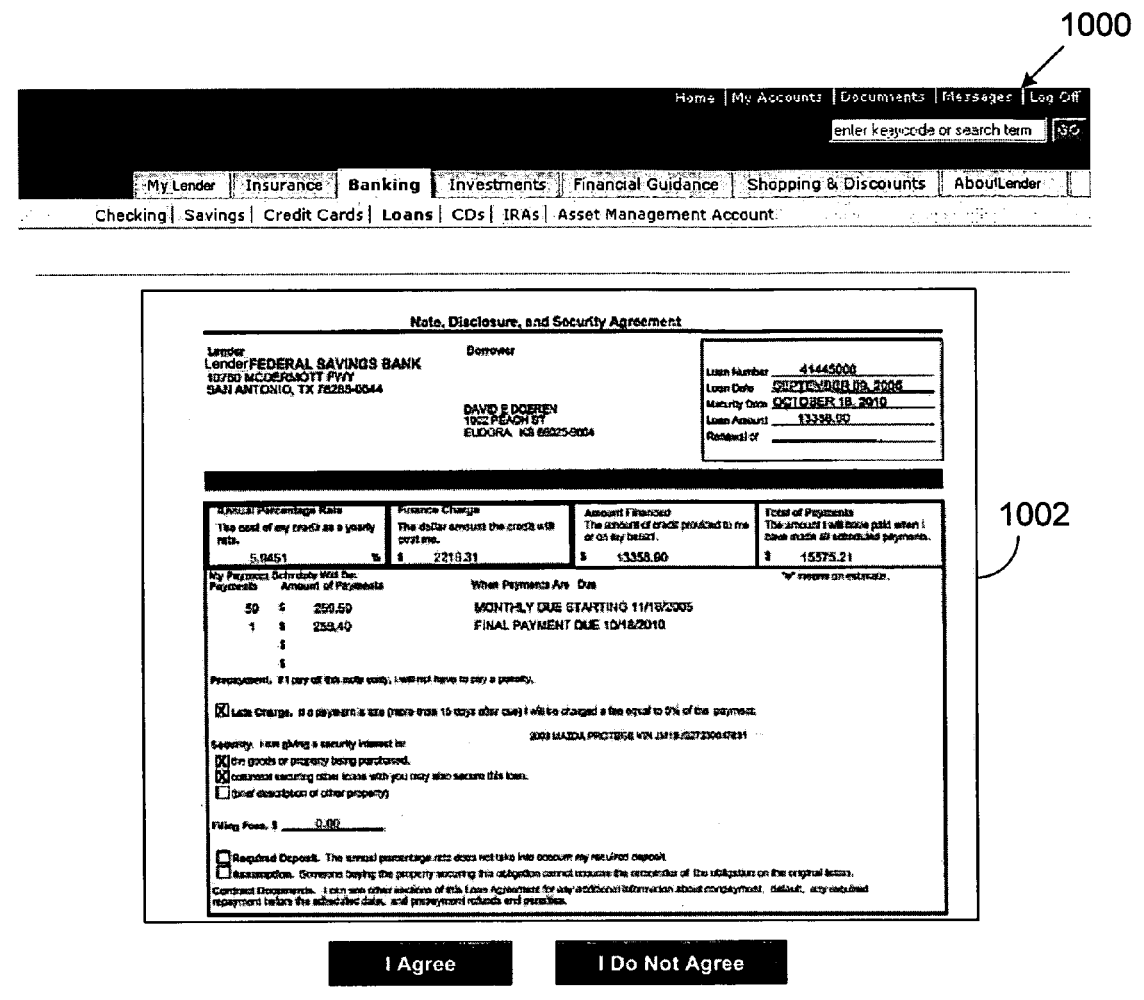

FIG. 10 illustrates a web-based note, disclosure, and security agreement 1000 generated by the consumer component 320 for securing the loan. This online agreement is displayed when the consumer has selected the electronic option (see FIG. 8). The note, disclosure, and security agreement 1000 specifies the terms of the loan and, when executed, grants to the lending institution a security interest in the automobile to be purchased. When this agreement 1000 is displayed, the consumer must either accept or decline the loan by selecting an appropriate hyperlink.

Figure 11:
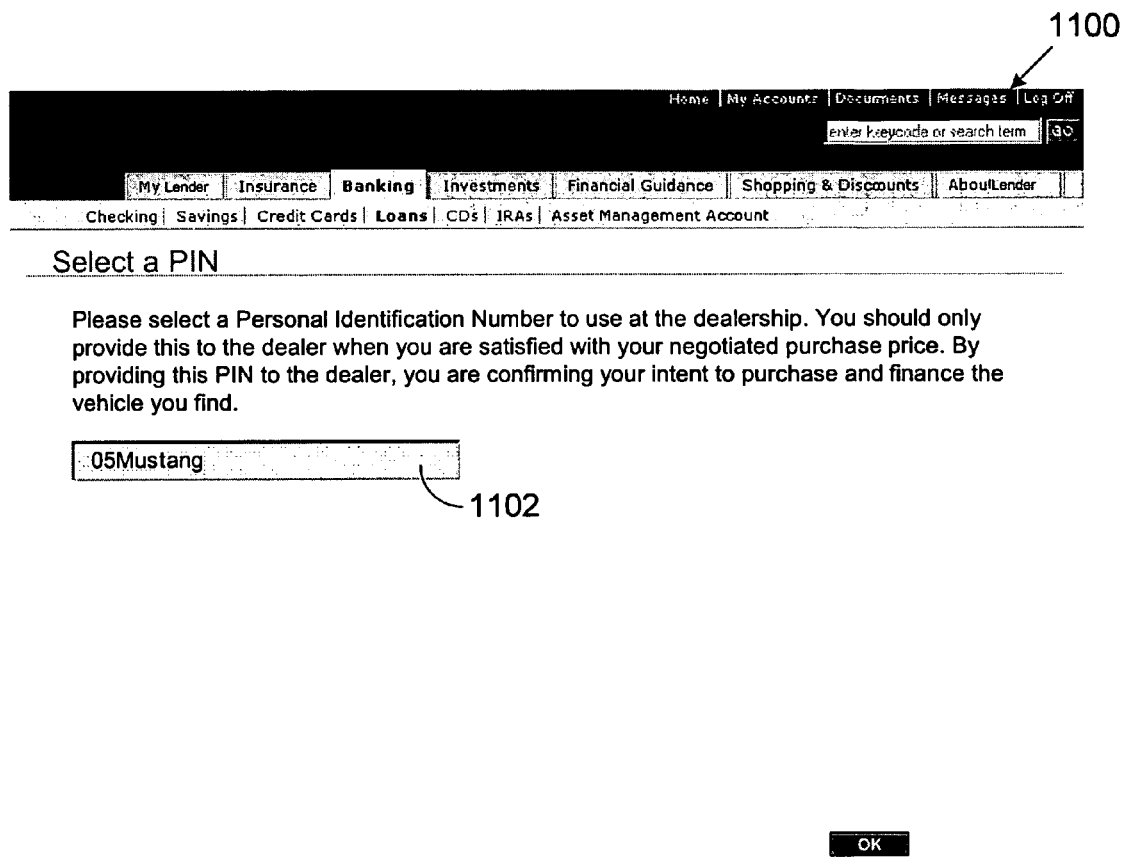

Once the consumer has accepted the note, disclosure, and security agreement 1000, he/she may be taken to a PIN selection web page 1100, as shown in FIG. 11. At this web page 1100, the consumer is requested to select a PIN 1102 that may then be used to verify the identity of the consumer when the purchase is made later at the dealership.

FIG. 12 illustrates a confirmation web page 1200 that may be used by the consumer component 320 to provide the consumer with the lender transaction ID 1202. As explained above, the lender transaction ID is generated by the consumer component 320 and may be used for confirming to the dealership that a loan of an appropriate amount has been guaranteed or otherwise provided to the consumer. In this regard, the lender transaction ID functions in much the same way as the "sight draft" mentioned previously, but without the complications and delays associated with the "sight draft." The lender transaction ID allows the dealership to treat the transaction as a cash transaction for all intents and purposes, as will be explained with respect to FIGS. 13-15.

Figure 13:
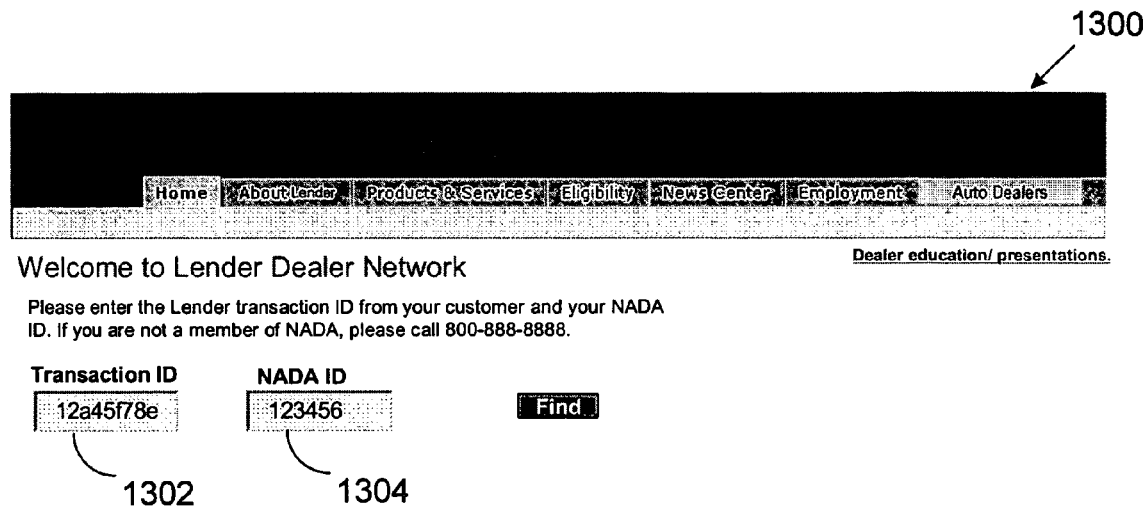

Thus far, the description has focused mainly on the consumer component 320 of the transaction module 318. FIGS. 13-15 illustrate exemplary web pages that may be used by the seller component 322 to interact, for example, with dealerships. Referring to FIG. 13, a dealership web page 1300 is shown that may be used by the seller component 322 to interact with a dealership. This web page 1300 may be displayed when the dealership accesses the lender computing system 202 to complete the transaction (i.e., after the consumer and the dealership have agreed on a purchase price for the contemplated purchase and the consumer has disclosed the lender transaction ID to the dealership). The dealership web page 1300 may include, among other things, a transaction ID field 1302 or the dealership to enter the lender transaction ID. In some embodiments, the dealership web page 1300 may also include a National Automobile Dealership Association (NADA) identification field 1304 for entering the dealership's NADA identification. The NADA identification may then be used to verify that the dealership is a legitimate automobile dealer before any payment is made to that dealership. In some embodiments, various incentives, such as listing on the lending institution's list of preferred dealerships, may be provided to the dealership to become a member of NADA or other similar organizations.

After the lender transaction ID and the NADA ID have been entered and confirmed by the seller component 322, the dealership web page 1300 may request that the dealership enter various information related to the transaction details.

This is illustrated in FIG. 14 where a number of transaction detail fields have been added to the web page 1300. The transaction detail fields may include, for example, a VIN field 1306, a purchase price field 1308, and a manufacturer suggested retail price (MSRP) field 1310. The web page 1300 may also give the dealership a number of options regarding funding, including by cashier's check (option 1312) or by direct deposit (option 1314). Choosing the direct deposit option requires the dealership to enter the appropriate depositing information on the web page 1300, including the dealership's bank routing number (field 1316) and bank account number (field 1318).

Once the above information has been entered and verified, the final step to completing the transaction and obtaining payment for the dealership is for the consumer to verify his/her identity to the seller component 322. This is illustrated in FIG. 15 where a member authorization field 1320 has been added to the web page 1300 for the consumer to enter his/her previously selected PIN (see FIG. 11). If the PIN is determined to be valid, the seller component 322 instructs the lending institution to send to the dealership an amount of money equal to the purchase price specified by the dealership via the funding option selected (e.g., cashier's check, direct deposit).

Figure 16:
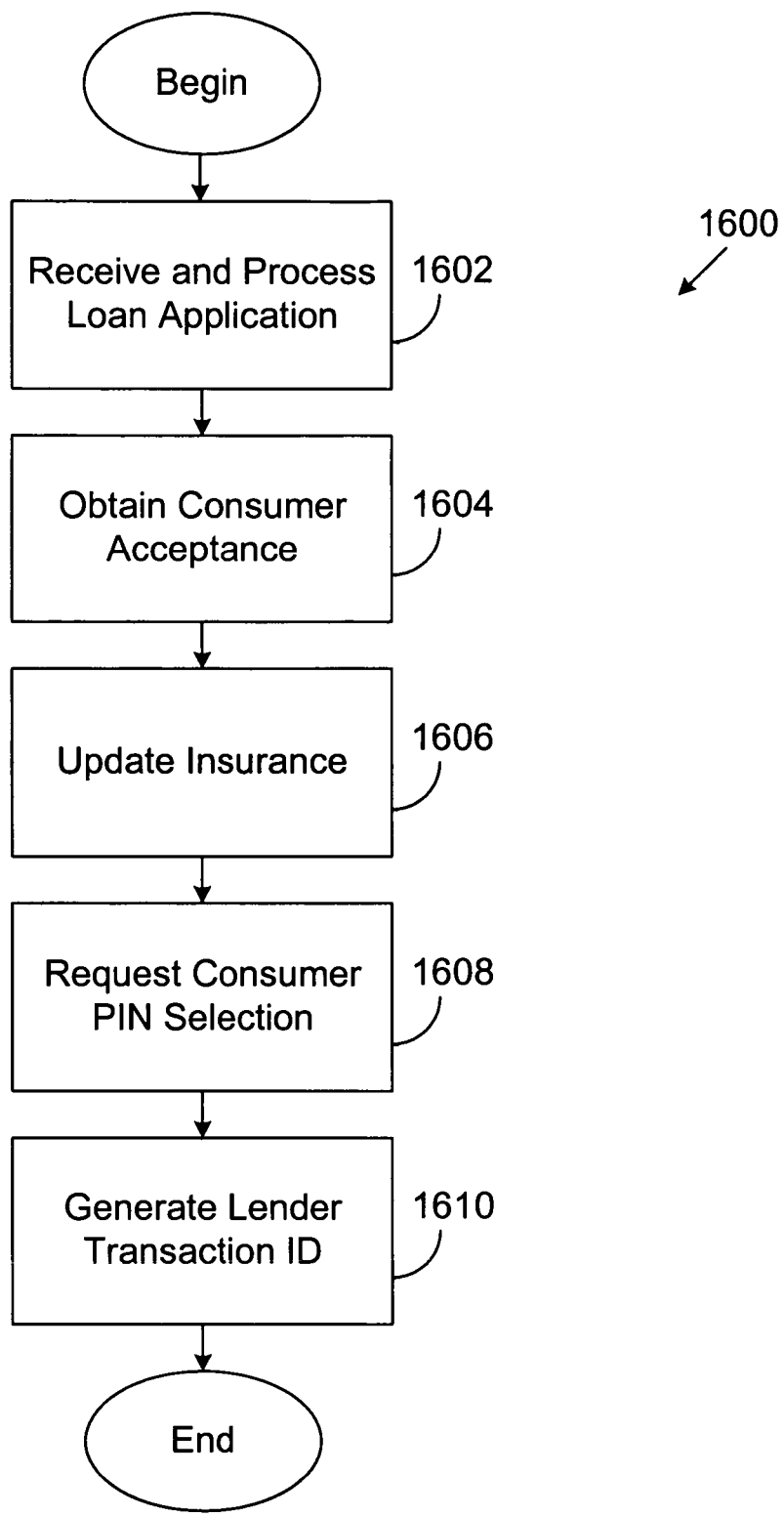
FIG. 16 illustrates a portion of a method for conducting a commercial transaction requiring a monetary loan.
Figure 17:
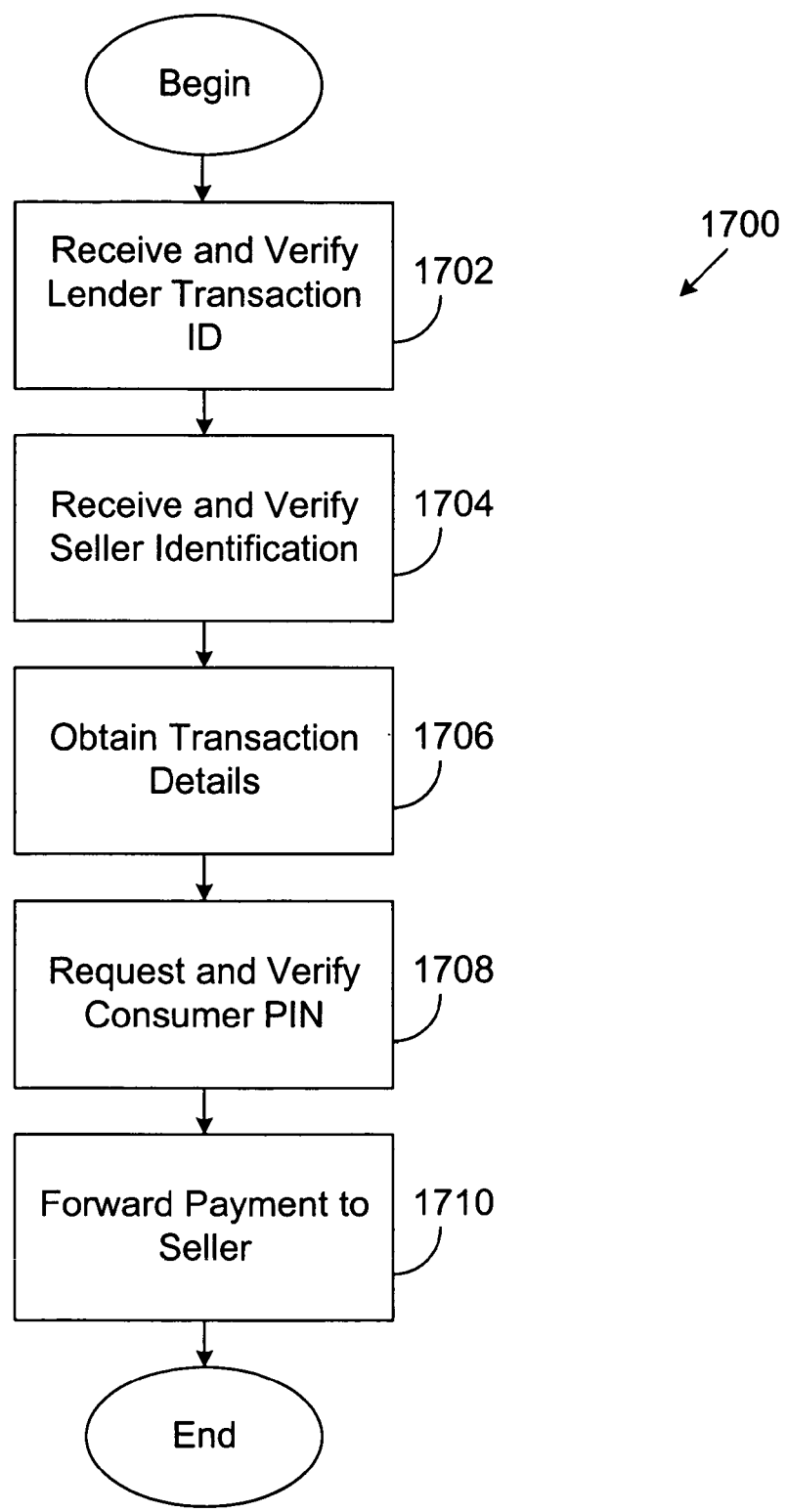
FIG. 17 illustrates another portion of a method for conducting a commercial transaction requiring a monetary loan.

The foregoing embodiments and various implementations and manifestations thereof may be summarized in one or more flowcharts, as shown in FIGS. 16 and 17. It should be noted that although the flow charts show a number of discrete steps, those having ordinary skill in the art will recognize that two or more steps may be combined into a single step, and an individual step may be divided into several component steps.

FIG. 16 illustrates a flowchart 1600 for a portion of a method that may be used by a lending institution to allow transactions of the type discussed herein to be conducted online. The method begins at step 1602 where the lending institution receives and processes loan applications online from consumers via a lender computing system. If a consumer is determined to be eligible for a monetary loan, the lending institution notifies the consumer of the loan terms via the lender computing system and obtains consumer acceptance of the loan terms at step 1604. Where the consumer has an existing insurance policy with the lending institution, it is also possible to update the insurance policy to include the item to be purchased at step 1606, thus allowing proof of insurance to be established more quickly. At step 1608, the consumer is asked to provide the lending institution with a PIN for subsequent identification verification purposes, and at step 1610, the lending institution generates a lender transaction ID that may be used by a seller to complete the transaction and obtain payment.

FIG. 17 illustrates a flowchart 1700 for another portion of a method that may be used by a lending institution to allow transactions of the type discussed herein to be conducted online. The method begins at step 1702, where the lending institution receives and verifies a lender transaction ID online from a seller via a lender computing system. The seller typically receives the lender transaction ID from the consumer after the consumer and the seller have agreed on a purchase price for the item to be purchased. In some embodiments, the lending institution may also receive and verify the seller identification online at step 1704 to determine whether the seller is a legitimate business. Assuming that the lender transaction ID is determined to be valid (and that the seller is a legitimate seller), the lending institution requests the seller to provide various details regarding the transaction at step 1706, such as the purchase price, VIN, and MSRP (where the item to be purchased is an automobile). At step 1708, the lending institution request and verifies the PIN previously selected by the consumer in order to authenticate the identity of the consumer. If the PIN is valid, the lending institution forwards the appropriate payment to the seller via the payment option (e.g., cashier's check, direct deposit, etc.) selected by the seller.

While the detailed description has been described with reference to one or more particular embodiments, those skilled in the art will recognize that many changes may be made thereto without departing from the spirit and scope of the description. For example, although the detailed description has been described in the context of an automobile purchase, the disclosed embodiments may be equally applicable to any transaction where a loan or financing is required, including the purchase of a home, a business, and the like. Moreover, although the detailed description has been illustrated herein by way of several exemplary web pages, other electronic transmission means may also be used. For example, in addition to (or instead of) web pages, information may also be transmitted by email from/to the consumer to/from the lending institution and the seller. Therefore, each of the foregoing embodiments and obvious variations thereof is contemplated as falling within the scope of the claimed subject matter, which is set forth in the following claims.

What is claimed is:

1. A method of facilitating a commercial transaction requiring financing by a lending institution, the method comprising:
    receiving financing application information via a network from a consumer involved in said commercial transaction, said financing application information including information required to determine whether said consumer is eligible for said financing;
    determining whether said consumer is eligible for said financing based on said financing application information;
    generating a unique transaction identification for said financing in response to determining that said consumer is eligible for said financing, said unique transaction identification being usable by a seller to obtain payment from said lending institution in connection with said commercial transaction; and
    electronically providing said unique transaction identification to said consumer via said network.

2. The method according to claim 1, further comprising obtaining acceptance of said one or more terms of said financing from said consumer via said network.

3. The method according to claim 2, further comprising providing favorable terms for said financing to said consumer in exchange for accepting said one or more terms of said financing via said network.

4. The method according to claim 1, further comprising:
    obtaining a personal identification number from said consumer via said network; and
    using said personal identification number to authenticate an identity of said consumer via said network in connection with of said commercial transaction.

5. The method according to claim 1, wherein said consumer has an insurance policy with said lending institution, further comprising:
    updating said insurance policy to cover one or more items purchased in connection with said commercial transaction.

6. The method according to claim 1, further comprising providing, via said network, proof of insurance to a seller involved in said commercial transaction.

7. The method according to claim 1, wherein said commercial transaction comprises an automobile purchase.

8. A computer-based system for facilitating a commercial transaction requiring financing by a lending institution, the system comprising:
- a network;
- a computing system connected to said network, said computing system configured to:
  - receive financing application information via said network from a consumer involved in said commercial transaction, said financing application information including information required to determine whether said consumer is eligible for said financing;
  - determine whether said consumer is eligible for said financing based on said financing application information;
  - generate a unique transaction identification for said financing in response to determining that said consumer is eligible for said financing, said transaction identification being usable by a seller to obtain payment from said lending institution in connection with said commercial transaction; and
  - electronically provide said unique transaction identification to said consumer via said network.

9. The system according to claim 8, wherein said computing system is further configured to obtain acceptance of said one or more terms of said financing from said consumer via said network.

10. The system according to claim 9, wherein said computing system is further configured to provide favorable terms for said financing to said consumer in exchange for accepting said one or more terms of said financing via said network.

11. The system according to claim 8, wherein said computing system is further configured to:
- obtain a personal identification number from said consumer via said network; and
- using said personal identification number to authenticate an identity of said consumer via said network in connection with said commercial transaction.

12. The system according to claim 8, wherein said consumer has an insurance policy with said lending institution, said computing system further configured to:
- update said insurance policy to cover one or more items purchased in connection with said commercial transaction.

13. The system according to claim 12, wherein said computing system is further configured to provide, via said network, proof of insurance to a seller involved in said commercial transaction.

14. The system according to claim 8, wherein said commercial transaction comprises an automobile purchase.

15. A computer-readable medium having computer-readable instructions stored thereon for facilitating a commercial transaction requiring financing by a lending institution, said computer-readable instructions comprising:
- a user interface; and
- a consumer component controlling said user interface, said consumer component configured to:
  - receive financing application information via a network from a consumer involved in said commercial transaction, said financing application information including information required to determine whether said consumer is eligible for said financing;
  - determine whether said consumer is eligible for said financing based on said financing application information;
  - generate a unique transaction identification for said financing in response to determining that said consumer is eligible for said financing, said transaction identification being usable by a seller to obtain payment from said lending institution for said commercial transaction; and
  - electronically provide said unique transaction identification to said consumer via said network.

16. The computer-readable medium according to claim 15, wherein said consumer component is further configured to obtain acceptance of said one or more terms of said financing from said consumer via said network.

17. The computer-readable medium according to claim 16, wherein said consumer component is further configured to provide favorable terms for said financing to said consumer in exchange for accepting said one or more terms of said financing via said network.

18. The computer-readable medium according to claim 15, wherein said consumer component is further configured to:
- obtain a personal identification number from said consumer via said network; and
- using said personal identification number to authenticate an identity of said consumer via said network in connection with said commercial transaction.

19. The computer-readable medium according to claim 15, wherein said consumer has an insurance policy with said lending institution, said consumer component further configured to:
- update said insurance policy to cover one or more items purchased in connection with said commercial transaction.

20. The computer-readable medium according to claim 19, wherein said consumer component is further configured to provide, via said network, proof of insurance to a seller involved in said commercial transaction.

21. The computer-readable medium according to claim 15, wherein said commercial transaction comprises an automobile purchase.

* * * * *